(12) United States Patent
Kimura

(10) Patent No.: US 10,313,649 B2
(45) Date of Patent: Jun. 4, 2019

(54) IMAGE PROCESSING APPARATUS, CONTROL METHOD THEREOF, AND STORAGE MEDIUM

(71) Applicant: CANON KABUSHIKI KAISHA, Tokyo (JP)

(72) Inventor: Naoto Kimura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 88 days.

(21) Appl. No.: 15/719,747

(22) Filed: Sep. 29, 2017

(65) Prior Publication Data

US 2018/0115758 A1 Apr. 26, 2018

(30) Foreign Application Priority Data

Oct. 20, 2016 (JP) .................................. 2016-206092

(51) Int. Cl.
*H04N 9/77* (2006.01)
*H04N 5/208* (2006.01)
(Continued)

(52) U.S. Cl.
CPC .............. *H04N 9/77* (2013.01); *G06T 5/008* (2013.01); *H04N 1/4072* (2013.01);
(Continued)

(58) Field of Classification Search
CPC ...... H04N 9/77; H04N 1/4072; H04N 1/6027; H04N 5/208; H04N 5/23229; H04N 5/20;
(Continued)

(56) References Cited

U.S. PATENT DOCUMENTS 9,749,506 B2 * 8/2017 Matsumoto .......... H04N 5/2176
382/167
2006/0062562 A1 * 3/2006 Utagawa .................. G06K 9/36
382/276

(Continued)

FOREIGN PATENT DOCUMENTS

| JP | 2006-039666 A | 2/2006 |
| JP | 2009-272983 A | 11/2009 |
| JP | 2014-154108 A | 8/2014 |

*Primary Examiner* — Marly S Camargo
(74) *Attorney, Agent, or Firm* — Carter, DeLuca & Farrell LLP

(57) ABSTRACT

An image processing apparatus comprises: an image generation unit configured to generate one or more reduced images based on an input image, the input image and the reduced images forming hierarchized images; a gain map generation unit configured to generate a gain map for each hierarchical level by applying a first tone characteristic to each of the hierarchized images and also further applying a second tone characteristic to at least one of the reduced images; and a composing unit configured to compose the created gain maps to generate a composed gain map, wherein the gain map generation unit applies, for each subject region, the first tone characteristic and the second tone characteristic to the at least one of the reduced images, and wherein the first tone characteristic and the second tone characteristic are mutually different tone characteristics.

15 Claims, 12 Drawing Sheets

(51) Int. Cl.
*H04N 5/232* (2006.01)
*H04N 1/40* (2006.01)
*H04N 1/60* (2006.01)
*G06T 5/00* (2006.01)
*G06T 7/11* (2017.01)
*G06T 7/194* (2017.01)
*H04N 1/407* (2006.01)
*H04N 5/20* (2006.01)

(52) U.S. Cl.
CPC ........... H04N 1/6027 (2013.01); H04N 5/208 (2013.01); H04N 5/23229 (2013.01); *G06T 2207/20016* (2013.01); *H04N 5/20* (2013.01)

(58) Field of Classification Search
CPC ..................... G06T 5/008; G06T 5/002; G06T 2207/20016; G06T 2207/20012; G06T 7/11; G06T 7/194
USPC ...... 348/222.1, 234, 221.1, 362, 229.1, 255, 348/470, 528, 182, 440, 6, 73; 382/164, 382/171, 173, 169, 174, 263, 274, 240; 358/3.01, 3.1, 3.27, 521, 525
See application file for complete search history.

(56) References Cited

U.S. PATENT DOCUMENTS

| | | | |
|---|---|---|---|
| 2007/0115369 A1* | 5/2007 | Utagawa | H04N 5/228 348/222.1 |
| 2011/0050934 A1* | 3/2011 | Mitsunaga | H04N 5/208 348/252 |
| 2018/0225811 A1* | 8/2018 | Kimura | G06T 5/009 382/274 |
| 2019/0037102 A1* | 1/2019 | Kimura | G06T 5/20 382/254 |

* cited by examiner

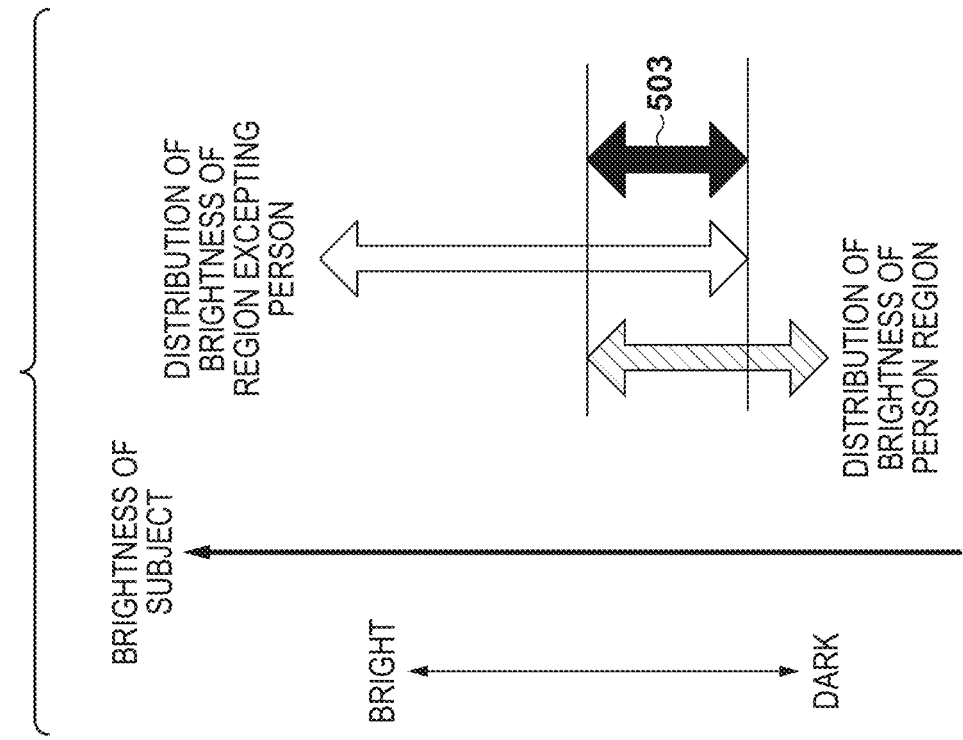
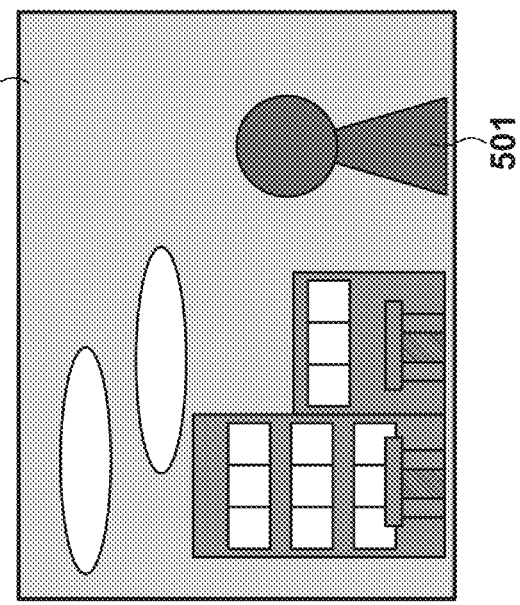

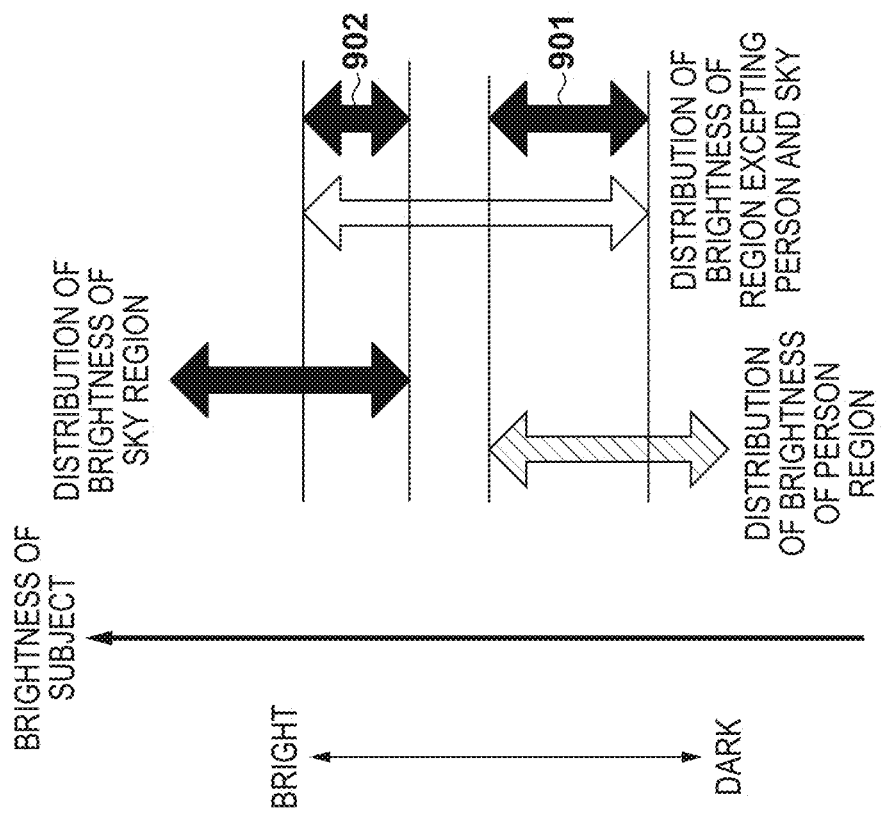
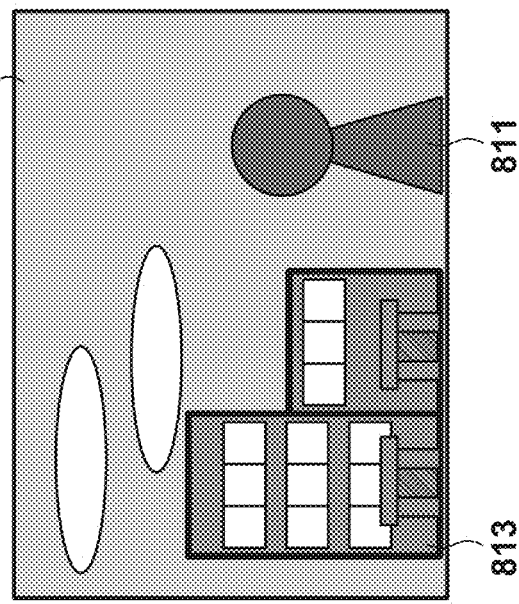

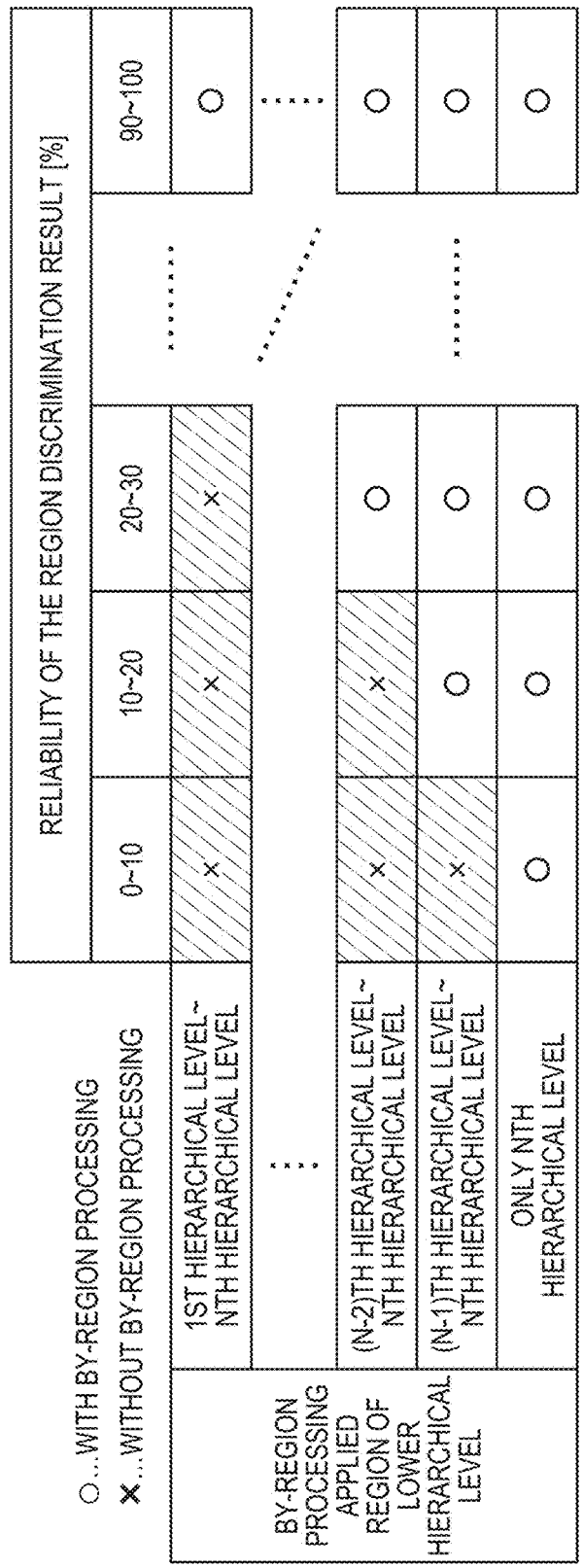

IMAGE PROCESSING APPARATUS, CONTROL METHOD THEREOF, AND STORAGE MEDIUM

BACKGROUND OF THE INVENTION

Field of the Invention

The present invention relates to an image processing apparatus, a control method thereof, and a storage medium.

Description of the Related Art

In recent years, a local tone mapping technique for improving the contrast of an image by applying a gain defined for each luminance signal is known.

In a case of performing tone processing that applies a gain defined for each luminance signal, when the gain is applied to a range of a specific luminance signal to brighten a predetermined subject region, there are cases where other regions brighten and the contrast decreases. For example, in a scene where there is a person region 501 as illustrated in FIG. 5A, there is a range where the brightness of the person region 501 and the brightness of a region 502 that is not a person region overlap, as illustrated in FIG. 5B. For this reason, in a case of applying a strong gain to brighten the person region, a region that is not a person region in which the distribution of brightnesses overlaps also becomes brighter, and the contrast of the non-person region decreases.

With respect to a problem where the brightness of a region that is not a desired subject region changes, a method of applying tone characteristics that differ per subject region may be considered. Japanese Patent Laid-Open No. 2009-272983 discloses a technique of setting a region in accordance with a level of a pixel, and applying approximately the same gain to the set region.

As with the conventional technique described above, in a case of applying tone characteristics that differ for each region (for example, for each subject), it is assumed that setting of a region (discrimination of a subject region) can be performed with high accuracy. However, typically there are many cases where it is difficult to perform discrimination of a subject region under various image capturing conditions with high accuracy, and there are cases where a discriminated region includes an incorrect detection. In other words, in a case where discrimination of a subject region cannot be performed with high accuracy (that is the discriminated region includes an incorrect detection), if tone characteristics that differ per region are applied, then the brightness will change for an unintended region. For this reason, even if there is an error in discrimination of a subject region in a case of applying tone characteristic that differ for each region, a tone correction technique that can reduce the influence of the error is desired.

SUMMARY OF THE INVENTION

The present invention has been made in consideration of the aforementioned problems, and realizes a technique that can, even if there is an error in discrimination of a subject region in tone correction that applies tone characteristics that differ for each subject region, reduce the effect of the error.

In order to solve the aforementioned problems, one aspect of the present invention provides an image processing apparatus comprising: an image generation unit configured to generate one or more reduced images that are reduced in a stepwise fashion based on an input image, the input image and the reduced images forming hierarchized images; a gain map generation unit configured to generate a gain map for each hierarchical level that represents a gain at each pixel position of an image, by applying a first tone characteristic to each of the hierarchized images and also further applying a second tone characteristic to at least one of the one or more reduced images; and a composing unit configured to compose gain maps generated for each hierarchical level to generate a composed gain map that represents gain applied to each pixel position of the input image, wherein the gain map generation unit applies, for each subject region, the first tone characteristic and the second tone characteristic to the at least one of the one or more reduced images, and wherein the first tone characteristic and the second tone characteristic are mutually different tone characteristics associated with a respective subject region included in the input image.

Another aspect of the present invention provides, an image processing apparatus, comprising: an image reduction unit configured to generate one or more reduced images by reducing an input image and generate an image group that includes the input image and the one or more reduced images; and a gain map generation unit configured to respectively generate a gain map that indicates a gain value at each position in an image by applying a predetermined tone characteristic to each image in the image group, wherein the gain map generation unit generates the gain map by applying, to the image out of the image group for which a resolution is relatively lowest, tone characteristics for which a characteristic differs for each subject region included in the image; a gain map composing unit configured to generate a composed gain map by composing a plurality of gain maps generated based on each image of the image group; and an image conversion unit configured to perform a tone conversion by using the composed gain map on the input image.

Still another aspect of the present invention provides, a control method of an image processing apparatus, the method comprising: generating one or more reduced images that are reduced in a stepwise fashion based on an input image, the input image and the reduced images forming hierarchized images; generating a gain map for each hierarchical level that represents a gain at each pixel position of an image, by applying a first tone characteristic to each of the hierarchized images and also further applying a second tone characteristic to at least one of the one or more reduced images; and composing gain maps generated for each hierarchical level to generate a composed gain map that represents gain applied to each pixel position of the input image, wherein, for each subject region, the first tone characteristic and the second tone characteristic are applied to the at least one of the one or more reduced images, and wherein the first tone characteristic and the second tone characteristic are mutually different tone characteristics associated with a respective subject region included in the input image.

According to yet another aspect of the present invention, an information processing system comprises, a control method of an image processing apparatus, the method comprising: generating at least one or more reduced images by reducing an input image and generate an image group that includes the input image and the at least one or more reduced images; respectively generating a gain map that indicates a gain value at each position in an image by applying a predetermined a tone characteristic to each image in the image group, wherein the gain map is generated by applying, to an image out of the image group for which a resolution is relatively low, tone characteristics for which a characteristic differs for each subject region included in the image; generating a composed gain map by composing a plurality of gain maps generated based on each image of the image group; and performing a tone conversion by using the composed gain map on the input image.

According to still yet another aspect of the present invention, a non-transitory computer-readable storage medium storing a computer program for causing a computer to function as an image processing apparatus comprising: an image generation unit configured to generate one or more reduced images that are reduced in a stepwise fashion based on an input image, the input image and the reduced images forming hierarchized images; a gain map generation unit configured to generate a gain map for each hierarchical level that represents a gain at each pixel position of an image, by applying a first tone characteristic to each of the hierarchized images and also further applying a second tone characteristic to at least one of the one or more reduced images; and a composing unit configured to compose gain maps generated for each hierarchical level to generate a composed gain map that represents gain applied to each pixel position of the input image, wherein the gain map generation unit applies, for each subject region, the first tone characteristic and the second tone characteristic to the at least one of the one or more reduced images, and wherein the first tone characteristic and the second tone characteristic are mutually different tone characteristics associated with a respective subject region included in the input image.

According to the present invention, it is possible to, even if there is an error in discrimination of a subject region in tone correction that applies tone characteristics that differ for each subject region, reduce the influence of the error.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 5A to 5B are views describing an example of a tone correction on an input image.

FIGS. 9A to 9B are views describing an example of a tone correction according to the second embodiment.

FIGS. 10A and 10B are views for giving an explanation regarding a method of deciding a hierarchy based on a result of discriminating a subject.

DESCRIPTION OF THE EMBODIMENTS

First Embodiment

Exemplary embodiments of the present invention will be explained hereinafter in detail, with reference to the drawings. Explanation is given below of an example in which a digital camera that can perform gain processing on an inputted image is used as an example of an image processing apparatus. However, the present embodiment is not limited to a digital camera, and can also be applied to electronic devices that can perform gain processing on an inputted image. These devices may include, for example, a personal computer, a mobile telephone including a smart phone, a game device, a tablet terminal, a watch-type or glasses-type information terminal, a medical device, a device for a monitoring system or an in-vehicle system, or the like.

(Configuration of Digital Camera)

Figure 11:
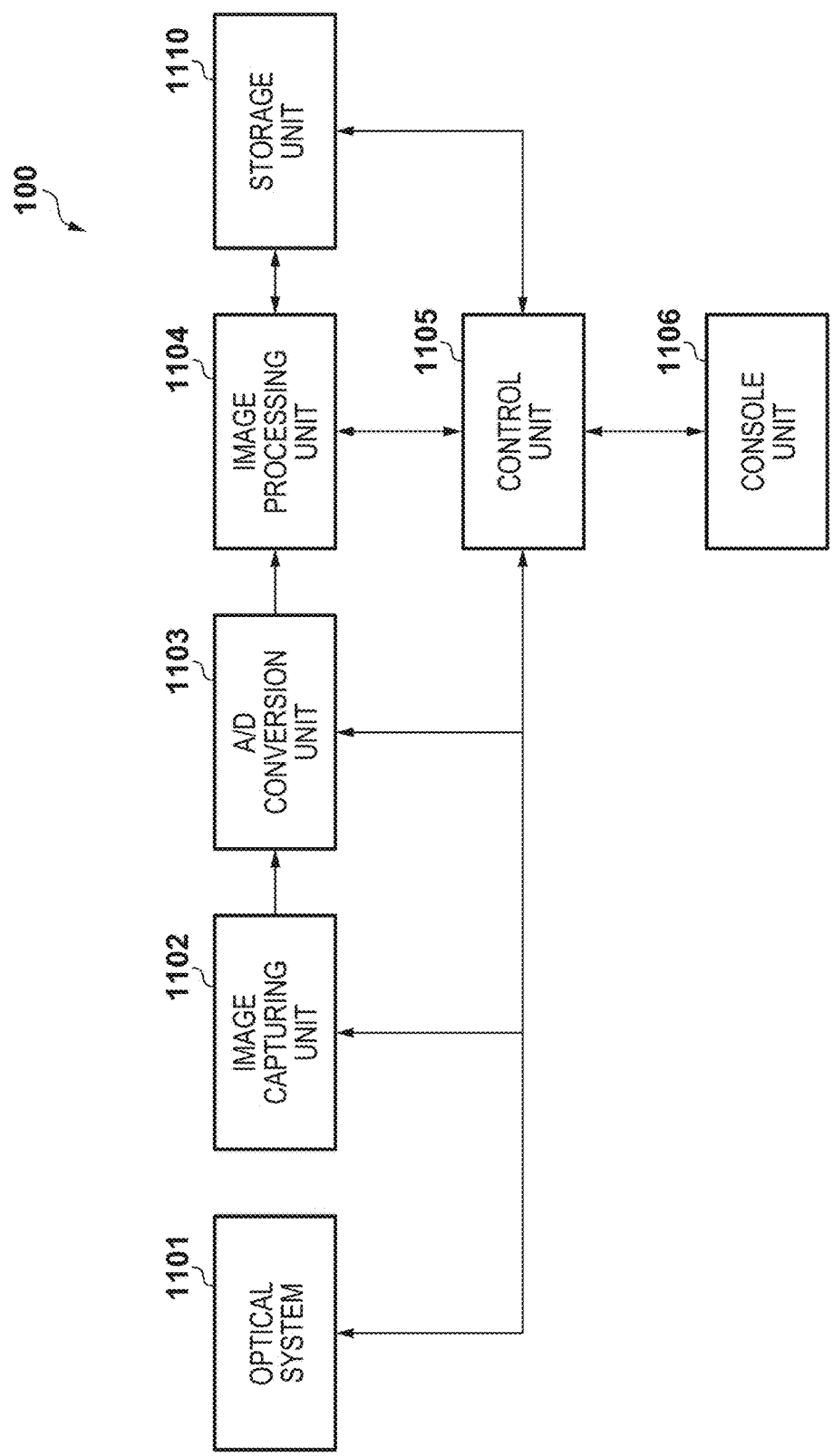
FIG. 11 is a view for illustrating an example of a functional configuration of a digital camera as an example of an image processing apparatus according to the first and second embodiments.

FIG. 11 illustrates an example of a functional configuration of a digital camera 100 as an example of an image processing apparatus. Note that, one or more of the functional blocks shown in FIG. 11 may be realized by hardware such as an ASIC, a programmable logic array (PLA), or the like, and may be realized by a programmable processor such as a CPU, an MPU, or the like, executing software. Also, these may be realized by a combination of software and hardware. Accordingly, in the following explanation, even in a case where different functional blocks are recited as the subject of operations, it is possible that this may be realized by the same hardware as the subject.

An optical system 1101 includes a shutter apparatus, an aperture adjustment apparatus, and a lens group formed from a zoom lens and a focus lens. In accordance with an instruction by a control unit 1105, the optical system 1101 adjusts an amount of light incident on an image capturing unit 1102, or a focus position or a scaling factor of a subject image incident on an image capturing element included in the image capturing unit 1102.

The image capturing unit 1102 includes an image capturing element that has a configuration in which a plurality of pixels that each have a photoelectric conversion element is arrayed two-dimensionally. The image capturing element performs a photoelectric conversion by each pixel of an optical image of a subject that is formed by the optical system 1101, and successively outputs an analog signal. The image capturing element may be an image capturing element such as a CCD (Charge-Coupled Device) image sensor, a CMOS (Complementary Metal Oxide Semiconductor) image sensor, or the like. An A/D conversion unit 1103 performs, in accordance with an A/D conversion circuit, an analog/digital conversion of an analog signal outputted from the image capturing unit 1102, and outputs a digital signal (image data) with units of pixels.

An image processing unit 1104 performs development processing such as pixel interpolating processing, and predetermined compression processing for storing an image to a storage unit 1110. In addition, it performs gain processing according to the present embodiment which is separately described later, and generates an output image to which the gain processing has been applied. The image processing unit 1104 is not limited to an image outputted from the A/D conversion unit 1103, and can also perform similar image processing or decompression processing to an image read from the storage unit 1110. Note that the image processing unit 1104 may be realized by a dedicated image processing circuit, and functions of the image processing unit 1104 may be realized through software in accordance with the control unit 1105 executing a program.

The control unit 1105 includes a CPU or an MPU, a ROM, a RAM or the like for example, and controls the entirety of the digital camera 100 by loading a program stored in the ROM into a work area of the RAM and executing it.

A console unit 1106 includes an operation member such as a touch panel, a dial, a button, or a switch, for example, and conveys an operation by a user to the control unit 1105. If part of the console unit 1106 is a touch panel, a captured or stored image may be displayed on the touch panel in addition to displaying an operation menu thereon. The storage unit 1110 includes a storage medium such as a magnetic disk or a memory card in which a semiconductor memory is mounted for example, and stores a captured image or reads out a stored image.

(Configuration of Image Processing Unit 1104)

Figure 1:
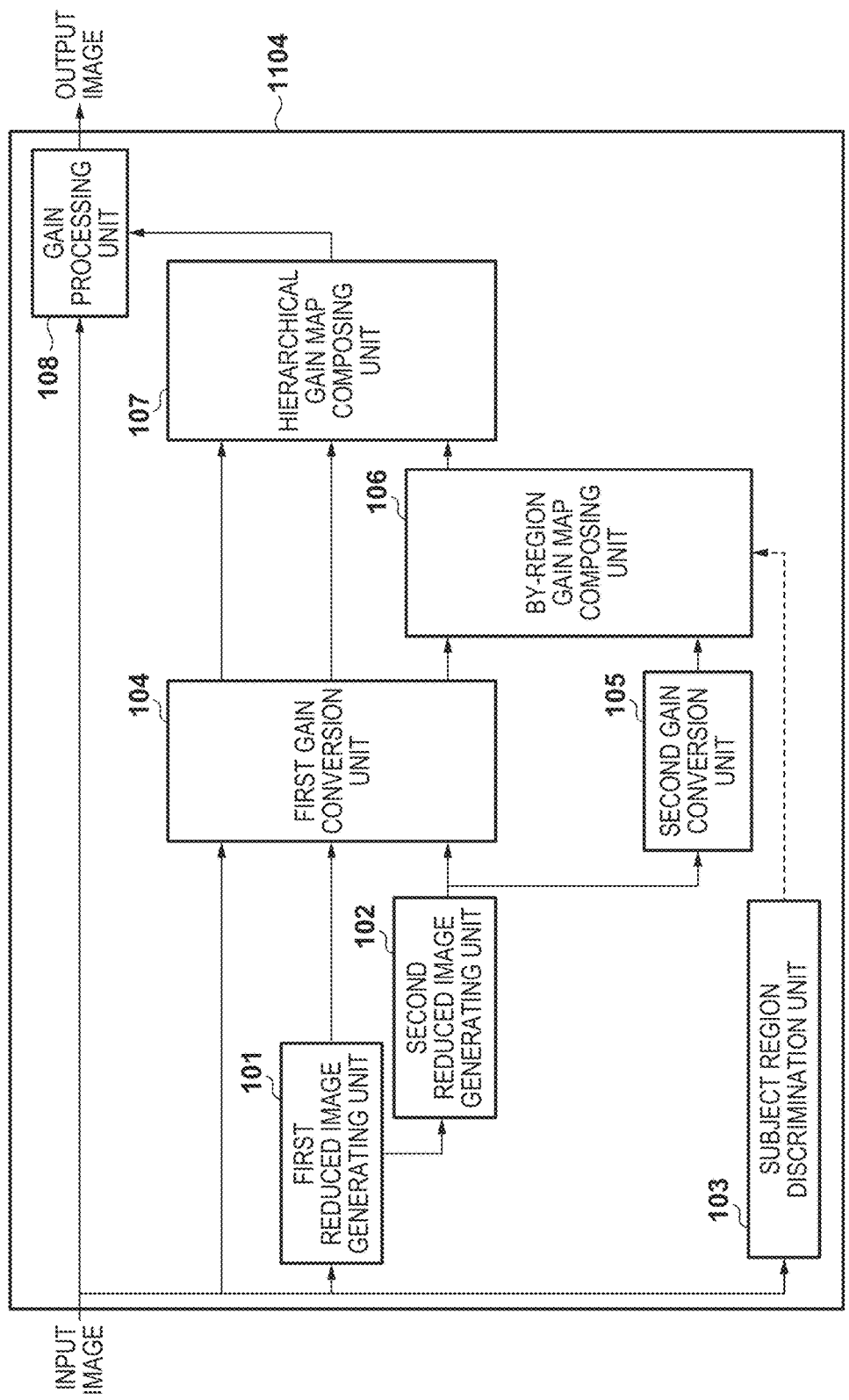
FIG. 1 is a block diagram illustrating an example of a functional configuration of an image processing unit according to a first embodiment.

FIG. 1 is a block diagram that illustrates an example of a functional configuration of the image processing unit 1104 according to the present embodiment. The image processing unit 1104 performs gain processing with respect to an inputted image, and then outputs the image. Note that the image data outputted from the A/D conversion unit 1103 is converted to a luminance signal from RGB data by a luminance value calculation unit (not shown), and an image formed by this luminance signal is inputted to the image processing unit 1104. The image processing unit 1104 includes a subject region discrimination unit 103 for discriminating a subject region from an input image. It also includes a first reduced image generating unit 101 and a second reduced image generating unit 102 for generating hierarchized images by gradually reducing the input image. It further includes a first gain conversion unit 104 and a second gain conversion unit 105 for converting a signal of a hierarchized image to a gain signal. In addition, it includes a by-region gain map composing unit 106 that composes a plurality of gain maps (gain maps) that correspond to the generated reduced images, in order to perform gain map generation for each subject region. It further includes a hierarchical gain map composing unit 107 that generates from the hierarchized gain maps a gain map to finally apply to the input image, and a gain processing unit 108 for applying a calculated gain to the input image and outputting an output image for which tone conversion processing has been performed (the gain is changed). The operation of each of these blocks is described below together with a series of operations that are indicated in FIG. 2.

(Series of Operations for Gain Processing)

Figure 2:
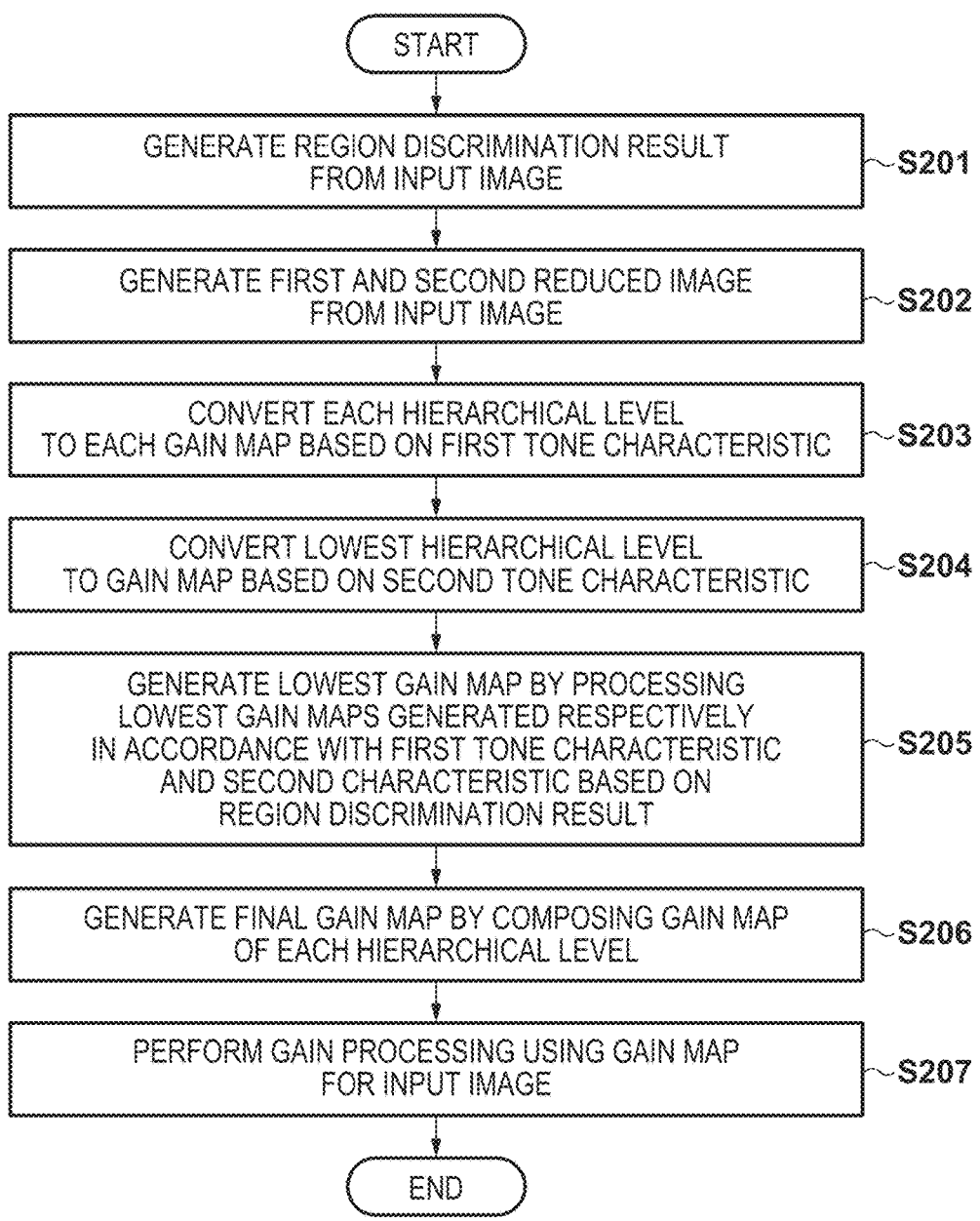
FIG. 2 is a flowchart for describing a sequence of operations for gain processing according to the first embodiment.

Next, with reference to FIG. 2, explanation is given regarding a series of operations for gain processing. Note that gain processing is started when captured image data is outputted from the A/D conversion unit 1103 and a luminance signal based on the image data is inputted to the image processing unit 1104.

In step S201, the subject region discrimination unit 103 discriminates a meaningful subject region from the input image. In the present embodiment, a person region is discriminated for example. For discrimination of the subject region, it is possible to use a typical region discrimination method that uses learning data or a feature amount of an image, as described in Japanese Patent Laid-Open No. 2006-39666 for example.

Figure 3A:
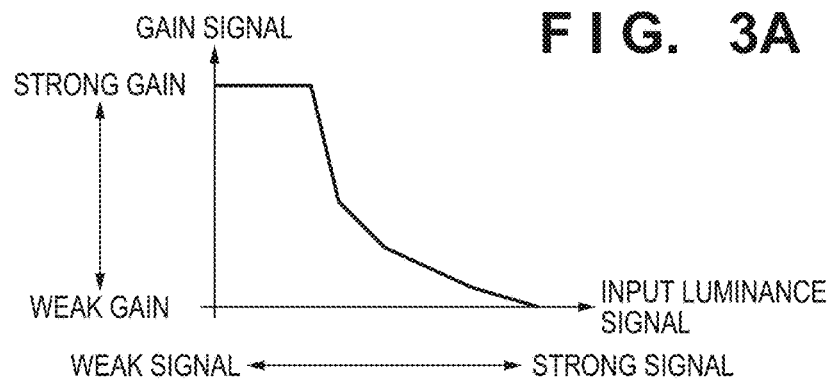
FIGS. 3A to 3D are views describing a tone characteristic, a gain map, and region discrimination result.
Figure 3B:
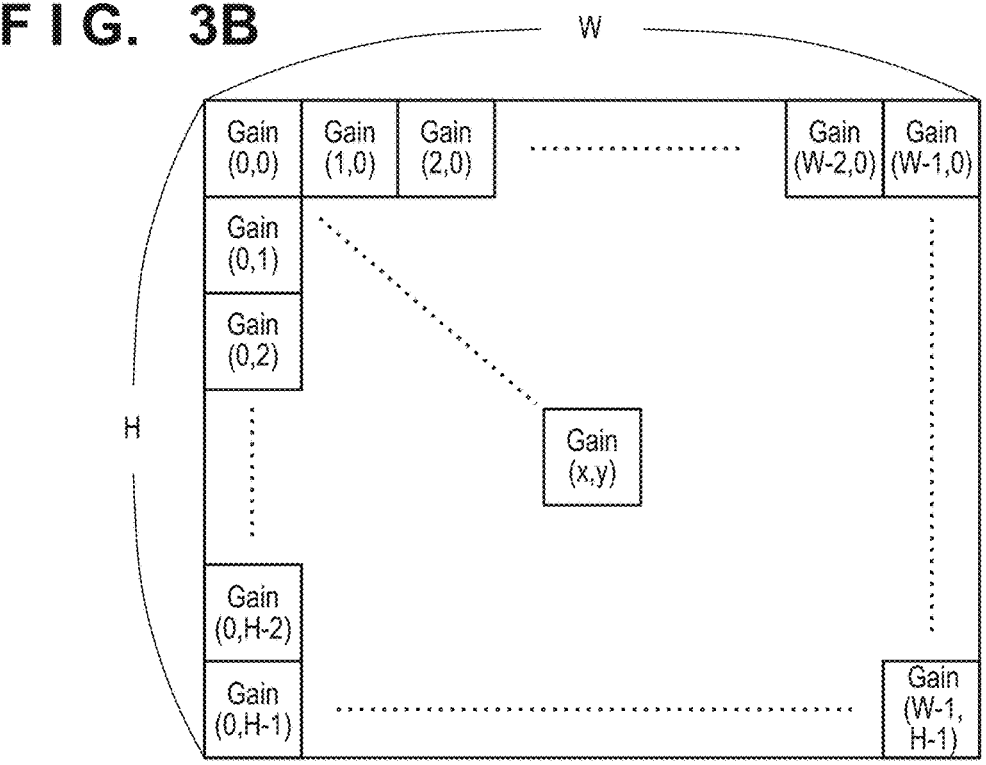
Figure 3C:
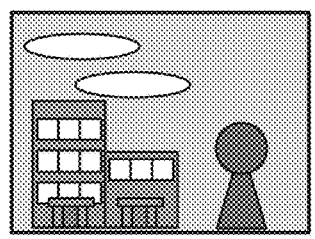
Figure 3D:
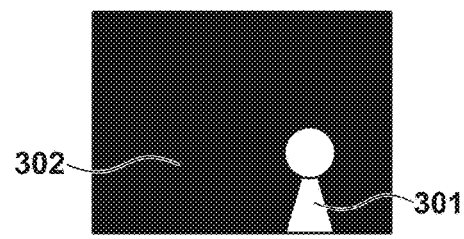

For example, in a case of discriminating a person region in a scene as illustrated in FIG. 3C, a result of discriminating a subject region is a monochrome image as illustrated in FIG. 3D, for example. In the example of FIG. 3D, a region discriminated to be a person region is a white region illustrated by a region 301, and conversely a region other than a person region is a black region as with a region 302. In the present embodiment, a range of signal values from a white region to a black region is outputted as a signal value from 255 to 0. The signal value indicates a value from 0 to 100% of a reliability of the region discrimination result, and for example 255 is assigned to a reliability of 100%, and 0 is assigned to a reliability of 0%. Note that, in the present embodiment, a region that is not a discriminated subject is referred to as a background region.

In step S202, the first reduced image generating unit 101 generates a first reduced image by performing reduction processing on the input image, and the second reduced image generating unit 102 generates a second reduced image based on the first reduced image. The input image, the first reduced image, and the second reduced image form hierarchized images (an image group) for which image sizes (or a degree of reduction) are different in a stepwise fashion. In the example of the present embodiment, the second reduced image is an image resulting from subjecting the first reduced image to further reduction processing. Note that, regarding the method of the reduction processing, it is possible to use a general method that is publicly known, such as reduction processing that uses a bi-linear method, for example.

In step S203, the first gain conversion unit 104 applies a first tone characteristic to the hierarchized images (the image group formed by the input image, and the first reduced image and the second reduced image that are generated in step S202), and generates a gain map that corresponds to each image. The tone characteristic is a table that indicates a relationship of gain to an input luminance signal, and, in the present embodiment, indicates a gain table in which the abscissa indicates an input luminance signal and the ordinate indicates a gain signal, as illustrated by FIG. 3A. A first tone characteristic is a tone characteristic associated with a background region. Details of the first tone characteristic are described later. By applying the first tone characteristic to each of the hierarchized images, the first gain conversion unit 104 respectively generates a gain map formed by a gain signal for each position (each pixel position) in an image as illustrated in FIG. 3B. Note that the gain map may be in a format such as a table if it is something that represents a gain signal (a gain value) of each position (each pixel position) in an image.

In step S204, the second gain conversion unit 105 generates a gain map by applying a second tone characteristic to an image of a lowest level (the second reduced image). A second tone characteristic is a tone characteristic associated with a person region. The second tone characteristic is described later.

In step S205, the by-region gain map composing unit 106 generates a gain map for the lowest level by composing the two gain maps of the lowest level (having the size of the second reduced image) to which the first tone characteristic and the second tone characteristic have been respectively applied. The by-region gain map composing unit 106 uses the region discrimination result generated in step S201 as a composition coefficient that is used for the composing. The region discrimination result is reduced to the size of the second reduced image. The by-region gain map composing unit 106 calculates Gaincomp(x, y), the value of the gain map resulting from composing, in accordance with Equation 1. However, with respect to the coordinates (x, y) of the second reduced image, let the value of the gain map generated in accordance with the first tone characteristic be Gain1(x, y), and the value of the gain map generated in accordance with the second tone characteristic be Gain2(x, y). In addition, let the signal value of the region discrimination result be area(x, y), and the maximum value that can be taken for the signal value for region discrimination be area_MAX.

$$Gaincomp(x, y) = \frac{(area\_MAX - area(x, y)) \cdot Gain1(x, y) + area(x, y) \cdot Gain2(x, y)}{area\_MAX} \quad \text{(Equation 1)}$$

Note that, although the region discrimination result area (x, y) is used unchanged in the example described above, a signal value for which a boundary of a discrimination result is made to not stand out by applying a low-pass filter, a bilateral filter, or the like may be used for the region discrimination result.

In step S206, the hierarchical gain map composing unit 107 generates a final gain map (a composed gain map) by composing three gain maps: the gain maps generated from each of the input image and the first reduced image in step S203, and the gain map generated from the second reduced image in step S205. For the processing for composition of the gain maps, it is possible to use a publicly known method (for example, Japanese Patent Laid-Open No. 2014-154108) for performing a weighted addition, in accordance with differences in gain signals, for the gain signal of a gain map having a large image size, and a gain signal for a gain map having a small image size.

In step S207, the gain processing unit 108 performs processing for applying gain to the input image by using the composed gain map that was generated in step S206. Letting the signal value of the input image at coordinates (x, y) be in (x, y) and the value of the second gain map be Gain(x, y), the signal value out(x, y) for the output signal after gain processing is represented as in Equation 2.

$$out(x,y) = Gain(x,y) \times in(x,y) \quad \text{(Equation 2)}$$

When the processing by the gain processing unit 108 ends, the image processing unit 1104 outputs the output image for which the gain processing has been performed (in other words tone conversion processing has been performed), and ends the series of operations for this processing.

In this way, in the gain processing in the present embodiment, gain processing to generate a final gain map is performed by composing the gain maps of each hierarchical level, with the input image as an upper hierarchical level and a reduced image as a lower hierarchical level. In such a case, configuration is such that, in a lower hierarchical level (namely an image having a relatively lower resolution), the gain map is generated by applying tone characteristics that are different for each subject region, based on the subject discrimination result. By applying tone characteristics for each subject region in a lower hierarchical level in this way, it is possible to smooth (in other words reduce) an influence due to an incorrect detection of a subject discrimination result near a boundary of a subject region.

Figure 4:
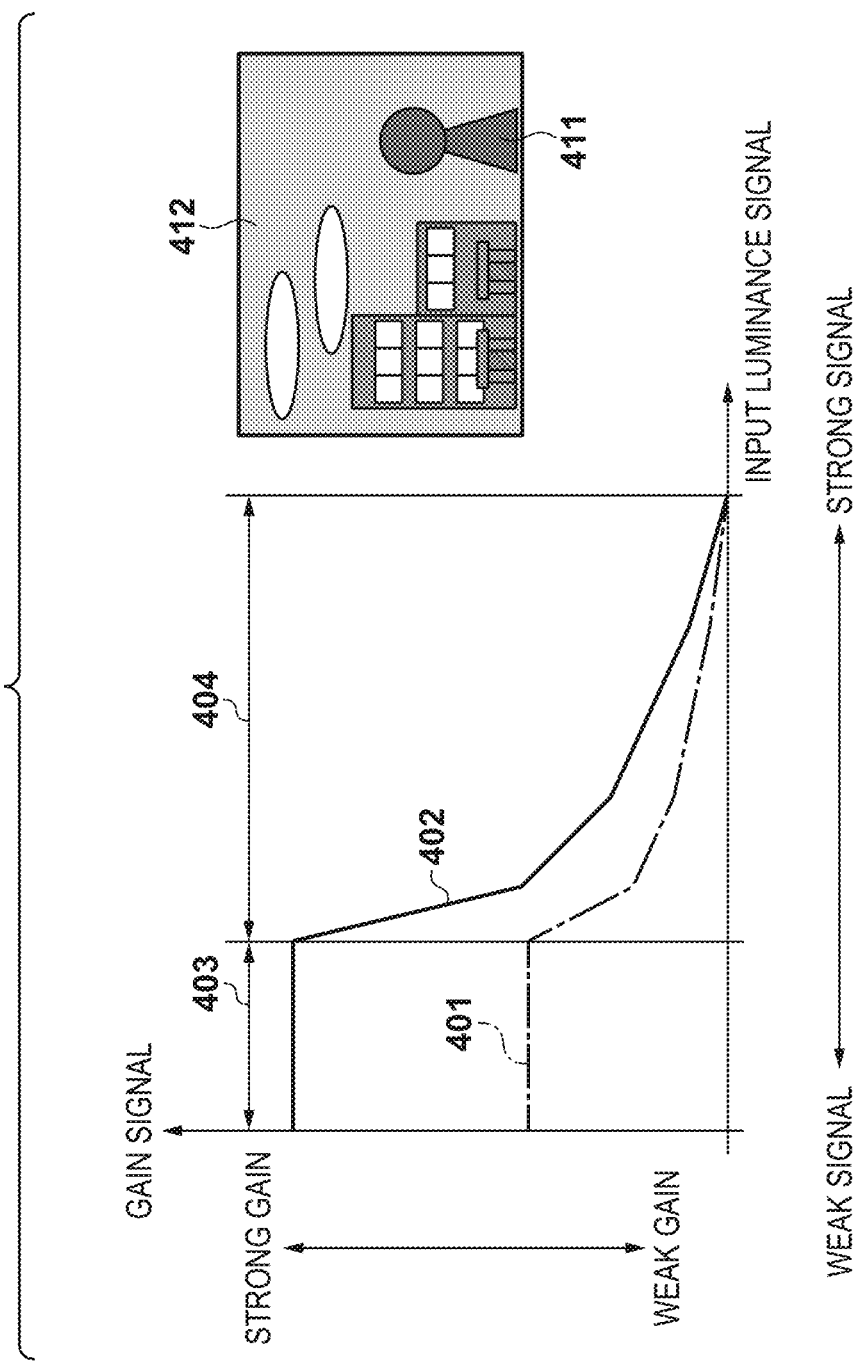
FIG. 4 is a view illustrating an example of a first tone characteristic and a second tone characteristic according to the first embodiment.

Next, with reference to FIG. 4 explanation is given in detail regarding the first tone characteristic and the second tone characteristic that are used in step S203 and in step S204.

FIG. 4 illustrates a gain table in which an abscissa is an input luminance signal and an ordinate is a gain signal, and the first tone characteristic is indicated as a tone characteristic 401 and the second tone characteristic is indicated as a tone characteristic 402. Each characteristic is such that gain is strongly applied at low luminances, and the gain weakens as the luminance becomes a high luminance. An image illustrated on the right side of FIG. 4 illustrates an example of an input image in the present embodiment, and includes a person region 411 (corresponds to the person region 501), and a region other than that (corresponds to the region 502).

As explained with reference to FIGS. 5A to 5B, in a conventional method, there is a problem in that, when gain is applied to brighten the person region 501, the region 502 that is not a person region also becomes brighter, and the contrast of the region that is not a person region decreases. In contrast to this, in the present embodiment, in a range 503 where brightnesses are overlapping, differing gain characteristics are applied to a person region and a region other than this. In other words, in a luminance range illustrated by reference numeral 403 (FIG. 4) as a range that corresponds to a person region, gains that greatly differ for each region are applied. For example, the second tone characteristic 402 has a characteristic of strongly applying gain so that, for a person region, a face approaches an appropriate brightness. In contrast to this, the first tone characteristic 401 has a characteristic such that, for a region that is not a person region, gain is made lesser than for a person region so that contrast does not decrease by making a dark portion too bright. Furthermore, the first tone characteristic 401 and the second tone characteristic 402 gradually approach the same characteristic in the range of luminances illustrated by reference numeral 404. By using tone characteristics such as these, it is possible to perform tone control so that the same or similar characteristics are achieved outside of a luminance range for which separating gains is desired. In addition, even in a case where erroneous extraction of a region discrimination result on a high-luminance side has occurred, it is possible to expect an improvement of robustness such as a harmful effect due to an incorrect detection for region discrimination not standing out, because there is mostly no difference in characteristics.

Note that, in the present embodiment, explanation was given for an example of a case of using a person region as a subject region to discriminate, but there is no limitation to a person region, and it is possible to use another subject region that is meaningful, such as a sky region or a vegetation region.

In the present embodiment as explained above, configuration is such that a final gain map is generated by composing gain maps with respected to hierarchized images. In such a case, configuration is such that, in a reduced lower hierarchical level (namely an image having a relatively lower resolution), the gain map is generated by applying a plurality of different tone characteristics that are associated with each subject region. With such a configuration, in a case of applying tone characteristics that differ for each subject region, it is possible to enhance robustness for a region discrimination result for a subject region, and it is possible to perform tone processing having a high effect in improving contrast. In other words, it is possible to, even if there is an error in discrimination of a subject region in tone correction that applies tone characteristics that differ for each subject region, reduce the influence of the error.

Furthermore, configuration is such that, a difference of gains for the tone characteristic for each region is made large in a range of brightnesses common for a desired subject region and a region other than that, and a difference of gains is made small in a range where the brightness is not common. With such a configuration, it is possible to satisfactorily maintain contrast in a region that is not a desired subject region. In addition, configuration is such that, the difference of gain for each region is magnified in a range of luminances (low luminance) where the difference in gain should be emphasized, and the difference in gain is made small in a region of other luminances (high luminances). With such a configuration, it is possible to perform tone processing by subject region that increases robustness even with respect to region discrimination in a high-luminance region.

Second Embodiment

Next, explanation is given for a second embodiment. The second embodiment differs from the first embodiment in that it uses the results of performing two or more types of subject determination processes to change tone characteristics to be applied to separate regions, but the configuration of the digital camera 100 is the same. Accordingly, the same reference numerals are given to the same elements, and overlapping explanation is omitted, and predominantly explanation is given for differences.

Figure 6:
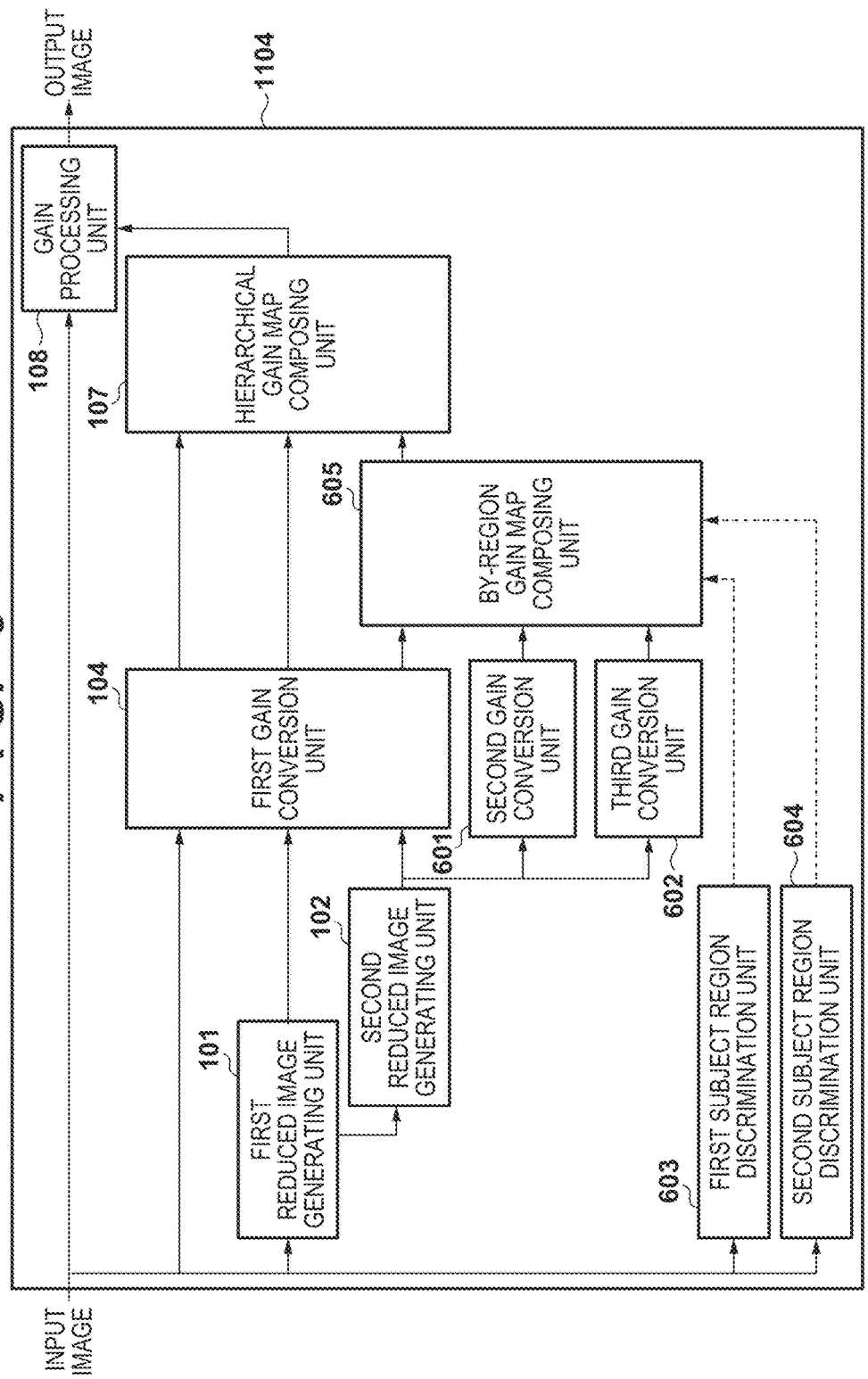
FIG. 6 is a block diagram illustrating an example of a functional configuration of an image processing unit according to a second embodiment.

FIG. 6 illustrates a configuration of the image processing unit 1104 according to the present embodiment. In the present embodiment, there are a first subject region discrimination unit 603 and a second subject region discrimination unit 604 for performing two differing types of region discrimination processing. In addition, there are three gain conversion units: the first gain conversion unit 104, a second gain conversion unit 601, and a third gain conversion unit 602. Furthermore, a by-region gain map composing unit 605 differs to the first embodiment. Details of each configuration are described later.

Figure 7:
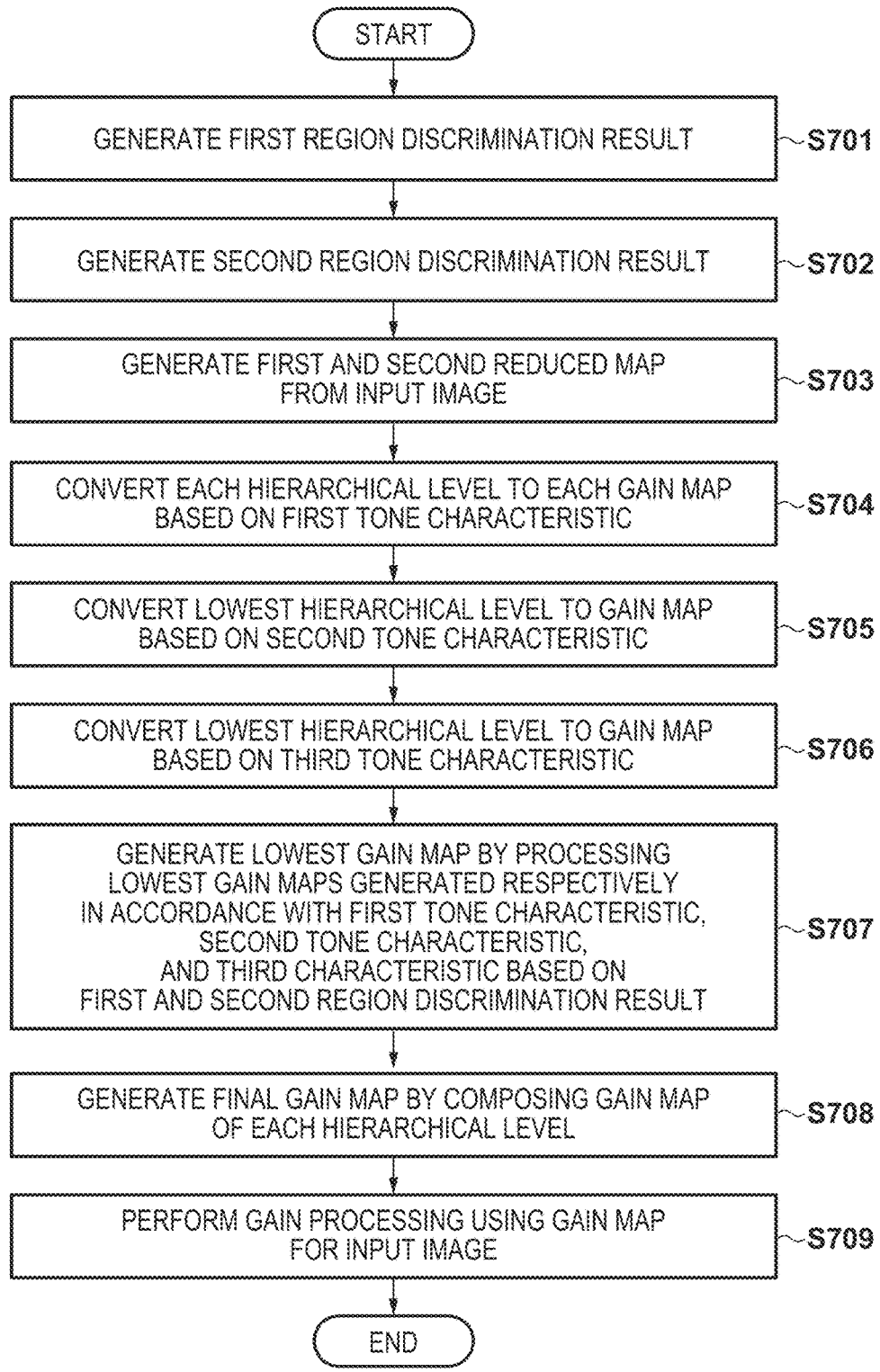
FIG. 7 is a flowchart for describing a sequence of operations for gain processing according to the second embodiment.

Next, explanation is given regarding gain processing according to the present embodiment, with reference to FIG. 7.

In step S701, the first subject region discrimination unit 603 discriminates a meaningful first subject region from the input image. For example, a person region is discriminated as a first subject region. In a method of discriminating a subject region, it is possible to use a publicly known method that uses learning data or a feature amount of an image, similarly to in the first embodiment. For a subject discrimination result, a signal value of 255 to 0 is output as a value of 100 to 0% for a reliability, similarly to in the first embodiment.

In step S702, the second subject region discrimination unit 604 discriminates a meaningful second subject region from the input image. For example, a sky region is discriminated as the second subject region. For a method of discrimination and a discrimination result, it is similar to that in step S701 which is described above. In step S703, the first reduced image generating unit 101 and the second reduced image generating unit 102 generate a first reduced image and a second reduced image by performing reduction processing on the input image, similarly to in the first embodiment.

In step S704, the first gain conversion unit 104 generates a gain map for each hierarchical level by applying the first tone characteristic to the input image and the first reduced image and the second reduced image that are generated in step S703. The first tone characteristic is a tone characteristic that assumes application to a background region. Details of the first tone characteristic are described later.

In step S705, the second gain conversion unit 601 generates a gain map that corresponds to the second tone characteristic by applying the second tone characteristic to the second reduced image. The second tone characteristic is a tone characteristic that assumes application to a person region. Details of the second tone characteristic are described later.

In step S706, the third gain conversion unit 602 generates a gain map that corresponds to the third tone characteristic by applying the third tone characteristic to the second reduced image. The third tone characteristic is a tone characteristic that assumes application to a sky region. The third tone characteristic is described later.

In step S707, the by-region gain map composing unit 605 composes each of the gain maps that are generated in accordance with the first tone characteristic, the second tone characteristic, and the third tone characteristic and are based on the second reduced image. For composition coefficients that are used in the composing, the first region discrimination result obtained in step S701 and the second region discrimination result obtained in step S702 are used. Here, let the value of each of the gain maps respectively generated in accordance with the first tone characteristic, the second tone characteristic, and the third tone characteristic and corresponding to coordinates (x, y) of the second reduced image be Gain1(x, y), Gain2 (x, y), and Gain3 (x, y). In addition, let the signal value for discrimination of the first and second regions be respectively area1(x, y) and area2(x, y), and let the maximum value that can be taken for the signal value for discrimination of the first and second regions be area_MAX. Here, the by-region gain map composing unit 605 can calculate Gaincomp(x, y), the value of the gain map resulting from composing, in accordance with Equation 3. Gaincomp_dash(x, y) is a partway result of composition.

$$Gaincomp\_dash(x, y) = \frac{(area\_MAX - area1(x, y)) \cdot Gain1(x, y) + area1(x, y) \cdot Gain2(x, y)}{area\_MAX}$$ (Equation 3)

$$Gaincomp(x, y) = \frac{(area\_MAX - area2(x, y)) \cdot Gaincomp\_dash(x, y) + area2(x, y) \cdot Gain2(x, y)}{area\_MAX}$$

Note that, in the present embodiment, the region discrimination results area1(x, y) and area2(x, y) are used unchanged, but a signal value after applying a low-pass filter, a bilateral filter, or the like to a region discrimination result may be used.

In step S708, the hierarchical gain map composing unit 107 generates a final gain map by composing the gain maps generated from each of the input image and the first reduced image in step S704, and the gain map generated based on the second reduced image in step S707. Explanation of composition method for a gain map is omitted because it is similar to that in the first embodiment.

In step S709, the gain processing unit 108 uses the gain map generated in step S708 to perform gain processing with respect to the input image, similarly to in the first embodiment. When the gain processing by the gain processing unit 108 completes, the image processing unit 1104 outputs the output image, and this series of operations ends.

Figure 8:
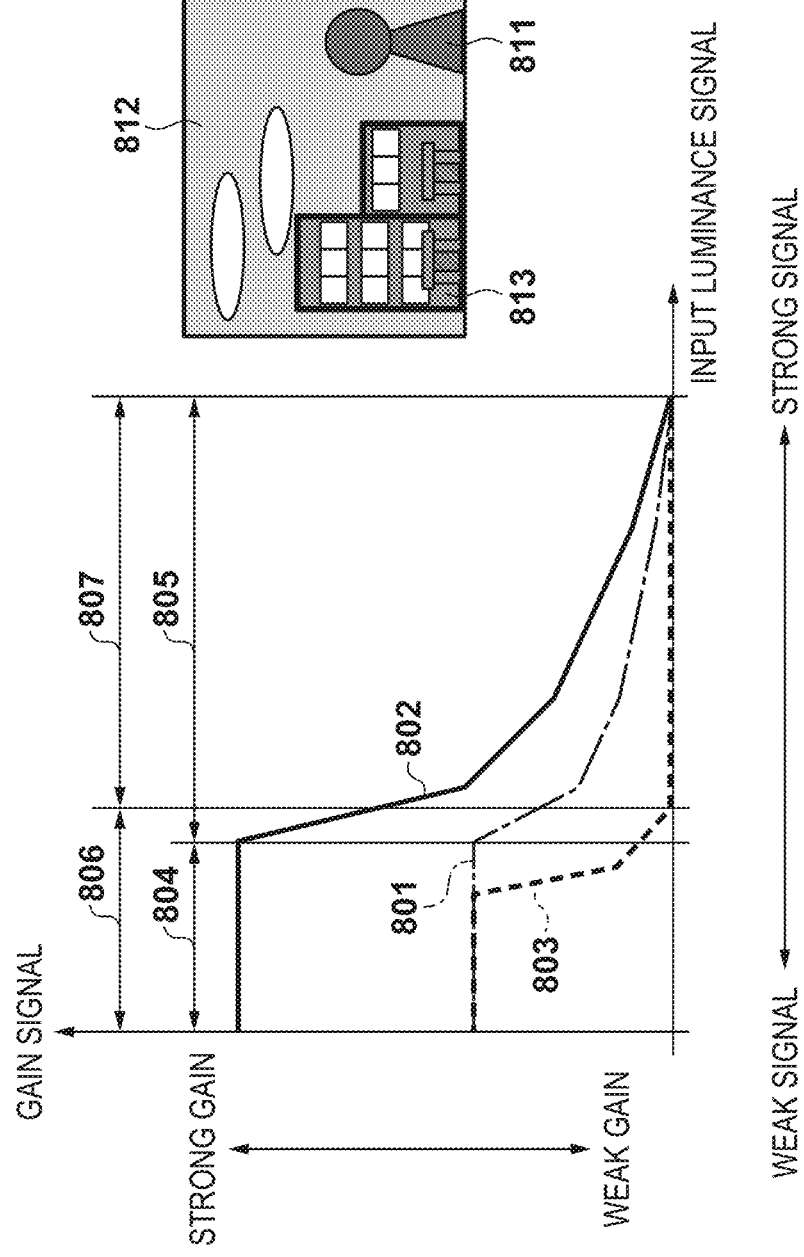
FIG. 8 is a view illustrating an example of a first tone characteristic, a second tone characteristic, and a third tone characteristic according to the second embodiment.

Additionally, with reference to FIG. 8, explanation is given regarding the first tone characteristic, the second tone characteristic, and the third tone characteristic which are respectively used in the aforementioned step S704, step S705, and step S706. In a gain table where an abscissa indicates an input luminance signal and an ordinate indicates a gain signal, the first tone characteristic corresponds to a tone characteristic 801, the second tone characteristic corresponds to a tone characteristic 802, and the third tone characteristic corresponds to a tone characteristic 803. Each characteristic is such that gain is strongly applied at low luminances, and the gain weakens as the luminance becomes a high luminance. An image illustrated on the right side of FIG. 8 illustrates an example of an input image in the present embodiment, and includes a person region 811, a sky region 812, and a region 813 that is apart from these.

As illustrated by FIGS. 9A to 9B, in the present embodiment, consideration is given to separating gain in a range 902 where brightnesses overlap for a sky region 812 and a region 813, in addition to a range 901 of brightnesses where a distribution of brightnesses overlap for a person region 811 and a region 813 (that is not a person or a sky region). While the second tone characteristic differentiates the gain greatly with respect to the first tone characteristic 801 in the luminance range 804, the third tone characteristic differentiates the gain greatly with respect to the second tone characteristic 802 in the luminance range 807. In other words, with respect to the second tone characteristic 802 which strongly applies gain so that a face becomes bright for a person region, the first tone characteristic 801 is a characteristic for making the gain weaker than for a person region, so that contrast does not decrease in accordance with a dark portion that is not a person region becoming too bright. In addition, with respect to the third tone characteristic 803 which lessens gain so that gain is not applied too much to a sky region, the first tone characteristic 801 has a characteristic of smoothly applying gain to suppress a decrease in contrast due to tone compression from a medium luminance to a high luminance.

Furthermore, in the present embodiment, in addition to the second tone characteristic gradually approaching the same characteristic as the first tone characteristic in the luminance range 805, the third tone characteristic also gradually approaches the same characteristic as the first tone characteristic in the luminance range 806. With such a configuration, it is possible to perform tone control such that the same characteristic is achieved outside of luminance ranges where separation of gain is desired, similarly to in the first embodiment. Similarly to in the first embodiment, even in a case where erroneous extraction of a region discrimination result on a high-luminance side occurs, it is possible to expect an improvement of robustness such as a harmful effect not standing out, because there is mostly no difference in tone characteristics.

In the present embodiment as explained above, in processing for generating a final gain map by composing gain maps that correspond to hierarchized images, configuration is such that the gain map is generated by applying a plurality of different tone characteristics that are associated with each subject in a reduced lower hierarchical level. In particular, in the reduced lower hierarchical level, configuration is such that the gain maps obtained from the plurality of different tone characteristics that are associated with each subject are composed based on a plurality of region discrimination results. With such a configuration, even in a case of using region discrimination results for a plurality of subjects, it is possible to perform a tone correction that reduces an influence of each region discrimination result.

Note that, in the first embodiment and the second embodiment, explanation was given of an example of generating a gain map in which tone characteristics are differentiated for each subject region in the second reduced image—in other words an image of a lowest level, but similar processing may be applied to the first reduced image.

In addition, configuration may be determined, in accordance with an output accuracy for the region discrimination processing (an output resolution of a subject discrimination result or a reliability of the region discrimination result), at which hierarchical level of an image (what degree of reduction) to apply the aforementioned processing for generating a gain map in which tone characteristics are differentiated for each subject region.

Figure 10B:
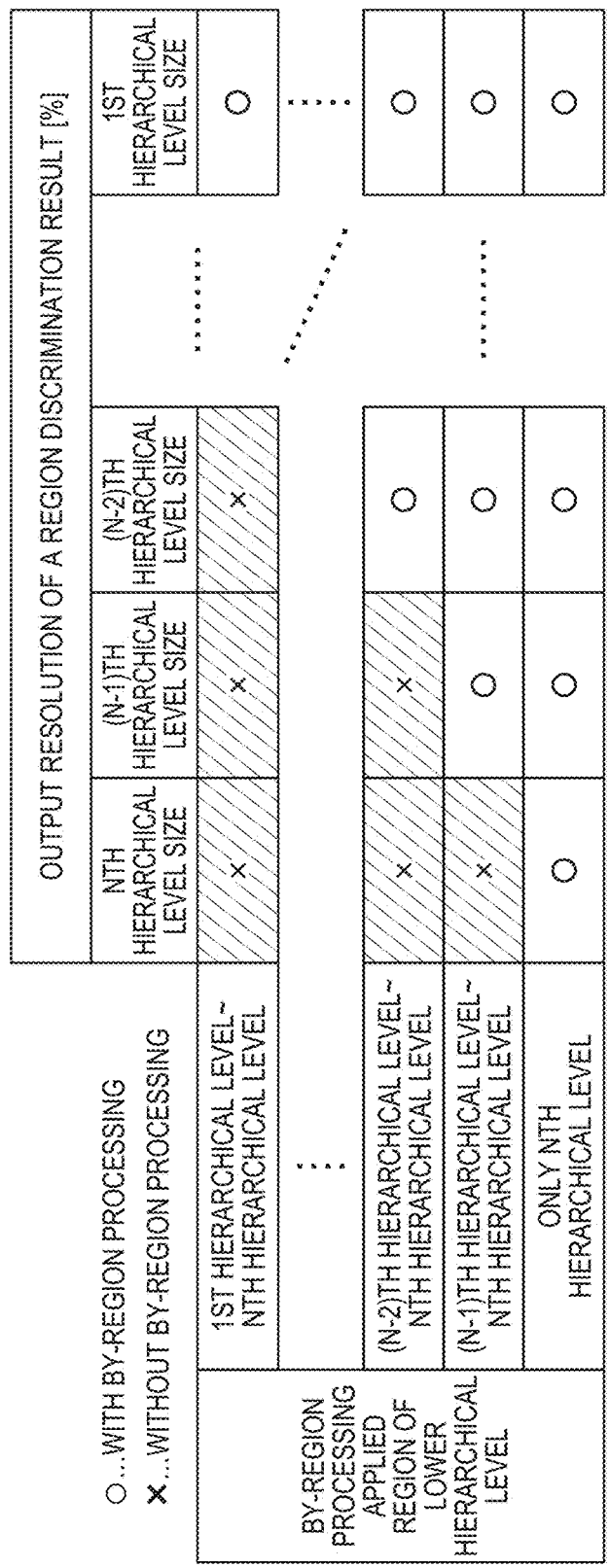

For example, FIGS. 10A and 10B illustrate tables for determining to what hierarchical level to apply the aforementioned processing for applying the differing tone characteristics in a case where a full size image is a first hierarchical level and an image of a lowest level having the smallest image size is an Nth hierarchical level. The table illustrated in FIG. 10A illustrates a table that allows for selection of a hierarchical level in accordance with a reliability of a region discrimination result. In contrast, the table illustrated in FIG. 10B indicates a table that allows for selection of a hierarchical level in accordance with an output resolution of a region discrimination result.

Note that, although in this example the reliability is something that indicates a maximum value out of reliabilities outputted by a region discrimination result, for example an average value of a discrimination result may be used. In the table of FIG. 10A, the gain map is generated by causing the tone characteristic per subject region to gradually differ in hierarchical levels above the Nth hierarchical level, as the reliability of the region discrimination result approaches 100%. By configuring as in FIG. 10A, it is possible to control, in accordance with a reliability of a region discrimination result, how much to reflect an effect due to tone processing by subject region in a gain map used in final gain processing. In addition, as in FIG. 10B, it is also possible to control, in accordance with what level the size of an output resolution for region discrimination is, whether to perform processing to generate a gain map by causing the tone characteristic for a subject region to differ from the Nth hierarchical level to the hierarchical level of that size.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-206092, filed Oct. 20, 2016, which is hereby incorporated by reference herein in its entirety.

What is claimed is:

1. An image processing apparatus comprising:
at least one processor or circuit configured to function as following units:
   an image generation unit configured to generate one or more reduced images that are reduced in a stepwise fashion based on an input image, the input image and the reduced images forming hierarchized images;
   a gain map generation unit configured to generate a gain map for each hierarchical level that represents a gain at each pixel position of an image, by applying a first tone characteristic to each of the hierarchized images and also further applying a second tone characteristic to at least one of the one or more reduced images; and
   a composing unit configured to compose gain maps generated for each hierarchical level to generate a composed gain map that represents gain applied to each pixel position of the input image,
wherein the gain map generation unit applies, for each subject region, the first tone characteristic and the second tone characteristic to the at least one of the one or more reduced images, and
wherein the first tone characteristic and the second tone characteristic are mutually different tone characteristics associated with a respective subject region included in the input image.

2. The apparatus according to claim 1, the at least one processor or circuit further configured to function as a discrimination unit configured to discriminate a predetermined subject region from the input image,
   wherein the gain map generation unit, based on a discrimination result by the discrimination unit, applies, for each subject region, the first tone characteristic and the second tone characteristic to the at least one of the one or more reduced images.

3. The apparatus according to claim 2, wherein the second tone characteristic is a tone characteristic that is associated with the predetermined subject region included in the input image, and the first tone characteristic is a tone characteristic that is associated with a region that is different to the predetermined subject region.

4. The apparatus according to claim 2, wherein the gain map generation unit differentiates a number of the one or more reduced images to which the first tone characteristic and the second tone characteristic are applied in accordance with an accuracy of region discrimination by the discrimination unit.

5. The apparatus according to claim 2, wherein the gain map generation unit applies the first tone characteristic and the second tone characteristic to the one or more reduced images for which a degree of reduction decreases as accuracy of region discrimination by the discrimination unit increases.

6. The apparatus according to claim 2, wherein, for the first tone characteristic and the second tone characteristic, a difference in gain applied to a range of luminance signals that are not in common with the predetermined subject region and a region that is not the predetermined subject region is smaller than a difference in gain applied to a range of luminance signals that are in common with the predetermined subject region and the region that is not the predetermined subject region.

7. The apparatus according to claim 1, wherein the gain map generation unit includes a most reduced image in the at least one of the one or more reduced images.

8. The apparatus according to claim 2, wherein the discrimination unit discriminates from the input image a second predetermined subject region that differs from the predetermined subject region, and
   wherein the gain map generation unit, based on the discrimination result by the discrimination unit, further applies a third tone characteristic that is different to the first tone characteristic and the second tone characteristic and is associated with the second predetermined subject region to the at least one of the one or more reduced images.

9. An image processing apparatus, comprising:
at least one processor or circuit configured to function as following units:
   an image reduction unit configured to generate one or more reduced images by reducing an input image and generate an image group that includes the input image and the one or more reduced images; and
   a gain map generation unit configured to respectively generate a gain map that indicates a gain value at each position in an image by applying a predetermined tone characteristic to each image in the image group, wherein the gain map generation unit generates the gain map by applying, to the image out of the image group for which a resolution is relatively lowest, tone characteristics for which a characteristic differs for each subject region included in the image;
   a gain map composing unit configured to generate a composed gain map by composing a plurality of gain maps generated based on each image of the image group; and
   an image conversion unit configured to perform a tone conversion by using the composed gain map on the input image.

10. The apparatus according to claim 9, the at least one processor or circuit further configured to function as a discrimination unit configured to discriminate a predetermined subject region from the image,
   wherein the gain map generation unit generates the gain map by applying the tone characteristics for which the characteristic differs for each subject region included in the image, based on a discrimination result by the discrimination unit.

11. The apparatus according to claim 10, wherein the gain map generation unit differentiates a number of reduced images to which different tone characteristics are applied for each subject region included in an image in accordance with an accuracy of region discrimination by the discrimination unit.

12. The apparatus according to claim 10, wherein the gain map generation unit increases a number of reduced images to which different tone characteristics are applied for each subject region included in an image as an accuracy of region discrimination by the discrimination unit increases.

13. A control method of an image processing apparatus, the method comprising:

generating one or more reduced images that are reduced in a stepwise fashion based on an input image, the input image and the reduced images forming hierarchized images;

generating a gain map for each hierarchical level that represents a gain at each pixel position of an image, by applying a first tone characteristic to each of the hierarchized images and also further applying a second tone characteristic to at least one of the one or more reduced images; and composing gain maps generated for each hierarchical level to generate a composed gain map that represents gain applied to each pixel position of the input image, wherein, for each subject region, the first tone characteristic and the second tone characteristic are applied to the at least one of the one or more reduced images, and wherein the first tone characteristic and the second tone characteristic are mutually different tone characteristics associated with a respective subject region included in the input image.

14. A control method of an image processing apparatus, the method comprising:

generating at least one or more reduced images by reducing an input image and generate an image group that includes the input image and the at least one or more reduced images;

respectively generating a gain map that indicates a gain value at each position in an image by applying a predetermined a tone characteristic to each image in the image group, wherein the gain map is generated by applying, to an image out of the image group for which a resolution is relatively low, tone characteristics for which a characteristic differs for each subject region included in the image;

generating a composed gain map by composing a plurality of gain maps generated based on each image of the image group; and performing a tone conversion by using the composed gain map on the input image.

15. A non-transitory computer-readable storage medium storing a computer program for causing a computer to function as an image processing apparatus comprising:

an image generation unit configured to generate one or more reduced images that are reduced in a stepwise fashion based on an input image, the input image and the reduced images forming hierarchized images;

a gain map generation unit configured to generate a gain map for each hierarchical level that represents a gain at each pixel position of an image, by applying a first tone characteristic to each of the hierarchized images and also further applying a second tone characteristic to at least one of the one or more reduced images; and a composing unit configured to compose gain maps generated for each hierarchical level to generate a composed gain map that represents gain applied to each pixel position of the input image, wherein the gain map generation unit applies, for each subject region, the first tone characteristic and the second tone characteristic to the at least one of the one or more reduced images, and wherein the first tone characteristic and the second tone characteristic are mutually different tone characteristics associated with a respective subject region included in the input image.

* * * * *